United States Patent
Lunttila et al.

(10) Patent No.: US 9,847,864 B2
(45) Date of Patent: Dec. 19, 2017

(54) PUCCH MULTIPLEXING SCHEME

(71) Applicant: Nokia Solutions and Networks Oy, Espoo (FI)

(72) Inventors: Timo Erkki Lunttila, Espoo (FI); Esa Tapani Tiirola, Kempele (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 131 days.

(21) Appl. No.: 14/349,411

(22) PCT Filed: Oct. 4, 2012

(86) PCT No.: PCT/EP2012/069590
§ 371 (c)(1),
(2) Date: Apr. 3, 2014

(87) PCT Pub. No.: WO2013/050449
PCT Pub. Date: Apr. 11, 2013

(65) Prior Publication Data
US 2014/0286276 A1 Sep. 25, 2014

Related U.S. Application Data

(60) Provisional application No. 61/542,966, filed on Oct. 4, 2011.

(51) Int. Cl.
*H04L 12/26* (2006.01)
*H04L 5/00* (2006.01)
(Continued)

(52) U.S. Cl.
CPC ........... *H04L 5/0091* (2013.01); *H04B 7/024* (2013.01); *H04L 1/003* (2013.01); *H04L 1/0026* (2013.01);
(Continued)

(58) Field of Classification Search
CPC ....... H04L 1/854; H04L 1/861; H04L 1/1607; H04L 5/0055; H04W 72/04; H04W 16/10
See application file for complete search history.

(56) References Cited

U.S. PATENT DOCUMENTS 8,797,979 B2 * 8/2014 Kwon ................... H04L 1/1854
370/329

FOREIGN PATENT DOCUMENTS

| EP | 2 426 833 A2 | 3/2012 |
|---|---|---|
| WO | WO2008153350 A1 | 12/2008 |
| WO | WO2010126247 A2 | 11/2010 |

OTHER PUBLICATIONS

3GPP TS 36.300 V10.4.0 (Jun. 2011); "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; 194 pgs.

(Continued)

*Primary Examiner* — Alvin Zhu
(74) *Attorney, Agent, or Firm* — Harrington & Smith

(57) ABSTRACT

A method for UL control signaling for carrier aggregation, CoMP and/or eICIC is disclosed. The method includes determining whether multiple FB (such as, a plurality of FB each for one channel of a multiple of channels, a plurality of FB regarding one channel (CSI, A/N, etc.), etc. for example) is to be simultaneously transmitted. The multiple FB are related to at least one CA, CoMP and/or eICIC transmission. A RS resource for an UL control signal message is selected. The RS resource includes an indication that the multiple FB is present in the UL control signal message. The method jointly encodes the multiple FB. The UL control signal message including the indication and the jointly encoded
(Continued)

multiple FB is transmitted from a UE to a network element. Apparatus and computer readable media are also disclosed.

21 Claims, 6 Drawing Sheets

(51) Int. Cl.
  *H04B 7/024* (2017.01)
  *H04L 1/18* (2006.01)
  *H04L 1/00* (2006.01)
  *H04L 1/16* (2006.01)
(52) U.S. Cl.
  CPC .......... *H04L 1/0027* (2013.01); *H04L 1/1671* (2013.01); *H04L 1/1861* (2013.01); *H04L 5/0007* (2013.01); *H04L 1/0077* (2013.01)

(56) References Cited

OTHER PUBLICATIONS

3GPP TSG-RAN WG1 Meeting #63; "Performance of CQI and A/N multiplexed on PUCCH"; Jacksonville, USA, Nov. 15-19, 2010; R1-105948; 10 pgs.

\* cited by examiner

| UCFI 610 | Number of Cells carrying CSI 620 |
|---|---|
| 00 | 1 or 5 |
| 11 | 2 |
| 01 | 3 |
| 10 | 4 |

| UCFI 710 | Codebook size 720 |
|---|---|
| 00 | CSI only |
| 11 | CSI + PCell A/N |
| 01 | CSI + MultiCell A/N |
| 10 | NA |

| UCFI 810 | Codebook size 820 |
|---|---|
| 00 | SingleCell CSI + PCell A/N |
| 11 | SingleCell CSI + MultiCell A/N |
| 01 | MultiCell CSI + PCell A/N |
| 10 | MultiCell CSI + MultiCell A/N |

Figure 8

PUCCH MULTIPLEXING SCHEME

TECHNICAL FIELD

Various exemplary and non-limiting embodiments relate generally to wireless communication systems, methods, devices and computer programs and, more specifically, relate to uplink control signaling.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A communication system known as evolved UTRAN (E-UTRAN, also referred to as UTRAN-LTE or as E-UTRA) has been specified within 3GPP. The DL access technique is OFDMA, and the UL access technique is SC-FDMA.

One specification of interest is 3GPP TS 36.300, V10.4.0 (2011-06), "3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 10)".

FIG. 1 reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
functions for RRM: Radio Bearer Control, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the Serving Gateway;
scheduling and transmission of paging messages (originated from the MME);
scheduling and transmission of broadcast information (originated from the MME or O&M); and
a measurement and measurement reporting configuration for mobility and scheduling.

The work on LTE Evolution continues to introduce new features as means to further improve DL performance. For example, CoMP, carrier aggregation, eICIC, DL SU-MIMO and DL MU-MIMO are expected to provide performance gains. One common denominator for all of these DL features is that their applicability relies heavily on the availability of accurate UL channel state information (CSI).

SUMMARY

The below summary section is intended to be merely exemplary and non-limiting.

The foregoing and other problems are overcome, and other advantages are realized, by the use of various exemplary embodiments.

In a first aspect thereof an exemplary embodiment provides a method for UL control signaling for carrier aggregation, CoMP and/or eICIC. The method includes determining whether multiple FB (such as, a plurality of FB each for one channel of a multiple of channels, a plurality of FB regarding one channel (CSI, A/N, etc.), etc. for example) is to be simultaneously transmitted. The multiple FB are related to at least one CA, CoMP and/or eICIC transmission. A RS resource for an UL control signal message is selected. The RS resource includes an indication that the multiple FB is present in the UL control signal message. The method jointly encodes the multiple FB. The UL control signal message including the indication and the jointly encoded multiple FB is transmitted from a user equipment to a network element.

In another aspect thereof an exemplary embodiment provides a method for UL control signaling for carrier aggregation, CoMP and/or eICIC. The method includes receiving, from a user equipment, an UL control signal message at a network element. The UL control signal message includes a RS resource which includes an indicator. The method also includes determining a payload size of the UL control signal message based at least in part on the indicator.

In a further aspect thereof an exemplary embodiment provides an apparatus for UL control signaling for carrier aggregation, CoMP and/or eICIC. The apparatus includes at least one processor; and at least one memory storing computer program code. The at least one memory and the computer program code are configured to, with the at least one processor, cause the apparatus to perform actions. The actions include determining whether multiple FB is to be simultaneously transmitted. The multiple FB are related to at least one CA, CoMP and/or eICIC transmission. A RS resource for an UL control signal message is selected. The RS resource includes an indication that the multiple FB is present in the UL control signal message. The multiple FB is jointly encoded. The actions also include transmitting, from a user equipment, the UL control signal message including the indication and the jointly encoded multiple FB to a network element.

In another aspect thereof an exemplary embodiment provides an apparatus for UL control signaling for carrier aggregation, CoMP and/or eICIC. The apparatus includes at least one processor; and at least one memory storing computer program code. The at least one memory and the computer program code are configured to, with the at least one processor, cause the apparatus to perform actions. The actions include receiving, from a user equipment, an UL control signal message at a network element. The UL control signal message includes a RS resource which includes an indicator. The actions also include determining a payload size of the UL control signal message based at least in part on the indicator.

In a further aspect thereof an exemplary embodiment provides an computer readable medium for UL control signaling for carrier aggregation, CoMP and/or eICIC. The computer readable medium is tangibly encoded with a computer program executable by a processor to perform actions. The actions include determining whether multiple FB is to be simultaneously transmitted. The multiple FB are related to at least one CA, CoMP and/or eICIC transmission. A RS resource for an UL control signal message is selected. The RS resource includes an indication that the multiple FB is present in the UL control signal message. The multiple FB is jointly encoded. The actions also include transmitting, from a user equipment, the UL control signal message including the indication and the jointly encoded multiple FB to a network element.

In another aspect thereof an exemplary embodiment provides a computer readable medium for UL control signaling for carrier aggregation, CoMP and/or eICIC. The computer readable medium is tangibly encoded with a computer program executable by a processor to perform actions. The actions include receiving, from a user equipment, an UL control signal message at a network element. The UL control signal message includes a RS resource which includes an indicator. The actions also include determining a payload size of the UL control signal message based at least in part on the indicator.

In a further aspect thereof an exemplary embodiment provides an apparatus for UL control signaling for carrier aggregation, CoMP and/or eICIC. The apparatus includes means for determining whether multiple FB is to be simultaneously transmitted; means for selecting a reference signal resource for an UL control signal message; means for jointly encoding the multiple FB; and means for transmitting the UL control signal message which includes the indication and the jointly encoded multiple FB to a network element. The multiple FB is related to at least one CA, CoMP and/or eICIC transmission and the RS resource includes an indication that the multiple FB is present in the UL control signal message In another aspect thereof an exemplary embodiment provides an apparatus for UL control signaling for carrier aggregation, CoMP and/or eICIC. The apparatus includes means for receiving, from a user equipment, an UL control signal message at a network element; and means for determining a payload size of the UL control signal message based at least in part on an indicator. The UL control signal message includes a reference signal resource which includes the indicator

BRIEF DESCRIPTION OF THE DRAWINGS

The foregoing and other aspects of exemplary embodiments are made more evident in the following Detailed Description, when read in conjunction with the attached Drawing Figures, wherein:

FIG. 8 shows another example of multiplexing ACK/NACK and CSI for a multiple CSI case with the help of an UCFI in accordance with various exemplary embodiments.

DETAILED DESCRIPTION

Figure 1:
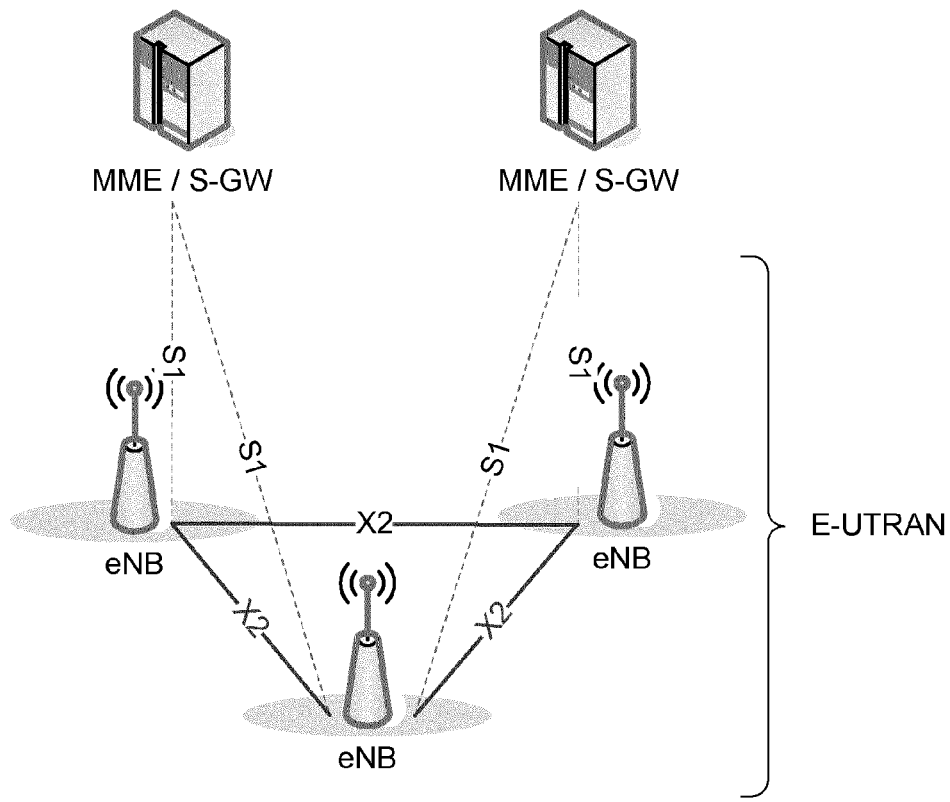
FIG. 1 reproduces FIG. 4-1 of 3GPP TS 36.300, and shows the overall architecture of the E UTRAN system.

Various exemplary embodiments provide uplink control signaling, for example, in an LTE-Advanced system using carrier aggregation. One focus is on the multiplexing solutions for ACK/NACK and channel state information (such as, periodic CSI including CQI, PMI and RI for example). Various exemplary embodiments provide sophisticated multiplexing options that support simultaneous transmission of ACK/NACKs and CSIs for multiple component carriers (CCs) and present solutions for improving the flexibility and performance of UL control signaling related to ACK/NACK and CSI with carrier aggregation.

The impact of CSI reporting on the overall system performance is two-fold. From the DL point of view, the more accurate and elaborate the CSI, the better. However, from the UL point of view, the CSI provides significant overhead by reserving bandwidth that could otherwise be used for data transmission. The efficiency of CSI transmission is expected to become even more critical with the upcoming DL features and system deployments. In particular with carrier aggregation, it is expected that asymmetrical DL-UL combinations are to be rather dominant, hence stretching the UL capacity required for increased CSI feedback (FB).

Periodic CSI reporting on the PUCCH is expected to be a fundamental mode of providing eNodeB information on the UEs' channel conditions. Based on the rather frequent periodic CSI reports the eNodeB can make decisions on which UEs to schedule and, if needed, request the UE to provide a more elaborate, aperiodic CSI reports on a per need basis.

The need for elaborate CSI feedback is expected to significantly increase. From the UL point of view, this is somewhat challenging as the capacity of periodic CSI on the PUCCH may be limited (such as, format 2/2a/2b is limited to only 11 bits for example). In recent LTE releases, this was, in practice, insufficient for anything other than simple, wideband CSI. With the expected DL features, it will be difficult to utilize a periodic PUCCH for even that purpose without having the reports frequently colliding.

Multiplexing of ACK/NACK and CSI

In LTE Release 10, dropping rules were introduced to resolve PUCCH collisions between ACK/NACK and CSI. In the case when multi-cell ACK/NACK and CSI (for two or more cells and using more than two bits) happen to coincide, the agreement is that ACK/NACKs will always have the higher priority and all the coinciding CSI reports are dropped (i.e., omitted). With the increasing number of DL carriers and/or TDD operations, where there are fewer UL subframes available for CSI transmission, this significantly limits the usefulness of any periodic CSI reporting.

Multiplexing of Periodic CSI Reports on PUCCH

The UE behavior, when two or more periodic CSI reports on PUCCH collide, is to drop all reports but one based on a predefined priority. However, while this limitation might be reasonable when considering FDD operation and two DL CCs, it becomes problematic with an increasing number of DL CCs and/or a TDD frame structure.

In the case of carrier aggregation, the benefits of periodic CSI reporting compared to aperiodic triggering are apparent (such as, no PDCCH overhead for example). Hence, it would be greatly beneficial to have significantly larger periodic PUCCH formats that are capable of delivering moderately large payloads. The direction of extending the capacity of periodic CSI reporting is expected to utilize a PUCCH format 3-like structure, with a possibility for frequency allocations larger than 1 PRB. Larger bandwidth would also help in better maintaining the CSI coverage in the interference limited scenarios.

Joint Coding of Different PUCCH Signals

A potential solution to the dropping of CSI issue described above is to allow for multiplexing of ACK/NACK and CSI with joint coding using either PUCCH format 2 or 3 (or their derivatives). However, this brings up a few issues: 1) payload size ambiguity (where the UE may miss one or more DL Assignments and hence not know that ACK/NACKs should be transmitted together with the CSI which leads to complicated error cases and/or a need for eNodeB to perform blind detection of data) and 2), similarly with the case of multiple CSIs, SCell activation/deactivation errors may result in ambiguity on which CSI signals are included into the joint report.

As discussed above, there are currently no solutions available for the support of simultaneous multi-cell ACK/NACK and CSI transmission. In the previously standardized radio access technologies there are some examples of control signaling, which is used to indicate the format of some other (data or control) signals.

WCDMA contains TFCI (transport format control information) bits in every 10 ms frame. TFCI is used to carry the bit rate and channel decoding parameters for a data channel (such as, DPDCH for example). One principle of LTE is that there is no data-associated control signaling included in the UL direction.

LTE TDD-PUCCH uses the A/N channel as the one corresponding to the last received PDSCH. For simultaneous positive SRI, the A/N channel is the SRI channel, the A/N bits are further bundled in spatial domain and the constellation point is selected depending on the number of decoded ACK. For simultaneous CQI/PMI or RI, the A/N bits are further bundled in spatial domain and the RS constellation point is selected depending on the number of decoded ACKs.

LTE TDD-PUSCH (ACK/NACK bundling) is based on the availability of the UL grant. When the UL grant is unavailable, a scrambling code is select based on the number of received DL PDSCH subframes; and if the UE does not detect any missed DL assignment, the bundled ACK/NACK bits are scrambled or, if the UE detects at least one missed DL assignment, the bundled NACK(s) are scrambled. On the other hand, when the UL grant is available, a scrambling code is selected based on the number of received DL PDSCH subframes and, if the UE does not detect missed DL assignment, the bundled ACK/NACK bits are scrambled or, if the UE detects at least one missed DL assignment, the anti-scrambling code is selected and the bundled NACK is scrambled. The anti-scrambling code may be given by, such as, X+2 mod 4 for example, where X is given by the value of the DAI in the UL grant.

LTE CSI feedback in which the CQI payload depends on the value of the previously transmitted Rank indicator (such as, the number of codeword for which CQI is derived, PMI signaling, etc. for example). In the case of 8-TX operation, there is a mode where the precoder type indicator (PTI) tells which type of PMI (such as, W1 or W2 for example) the following report shall contain.

The WCDMA case does not deal with the format of the data-non-associated control signal transmitted on the UL (such as, the TFCI defines the format of DPDCH for example). Furthermore, WCDMA application does not relate to error case handling of UL scheduling assignment (although TFCI errors will result in failed reception at the NB side).

The LTE TDD application uses "implicit" data associated control signaling (not with explicit/separate UCFI) which is part of constellation point/scrambling code selection. The LTE TDD signaling is used to convey the bundled ACK/NACK assuming a fixed A/N payload (such as, one or two bits for example).

Furthermore, none of the abovementioned conventional techniques are applicable for ACK/NACK and CQI multiplexing. Due to the dynamic nature of ACK/NACK signaling, it is not feasible to signal the transmission format beforehand (as is the case with RI or TFCI) since the UE will not have the information about the presence of ACK/NACK available until it receives the corresponding DL Assignment.

For a small increase in complexity, numerous advantages can be realized by various exemplary embodiments. ML-type receivers for PUCCH may more efficiently use PUCCH reference signals that have been mostly unused. The system is more robust in terms of signaling errors. New multiplexing options can be introduced without additional blind decoding burdens at the eNodeB. Existing performance requirements for the PUCCH Format 2a/2b can be used by being extended to cover new use cases. Spectral efficiency is increased by using deactivated CCs can be excluded in the multiple CSI case. Deactivated CCs can be excluded in the multiple CSI case to provide spectral efficiency.

Figure 2:
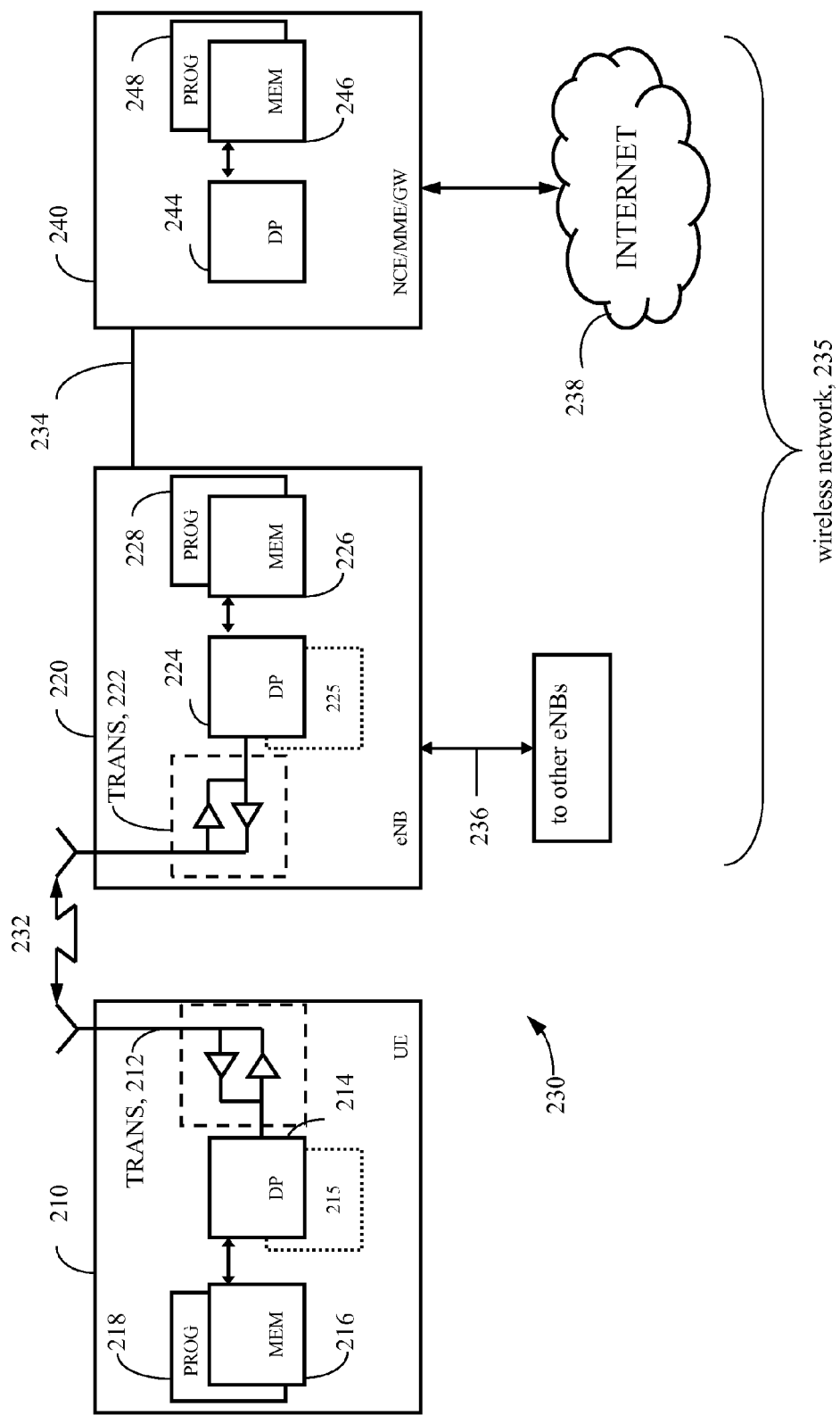
FIG. 2 shows a simplified block diagram of exemplary electronic devices that are suitable for use in practicing various exemplary embodiments.

Before describing in further detail various exemplary embodiments, reference is made to FIG. 2 for illustrating a simplified block diagram of various electronic devices and apparatus that are suitable for use in practicing exemplary embodiments.

In the wireless system 230 of FIG. 2, a wireless network 235 is adapted for communication over a wireless link 232 with an apparatus, such as a mobile communication device which may be referred to as a UE 210 for example, via a network access node, such as a Node B (base station), and more specifically an eNB 220 for example. The network 235 may include a network control element (NCE) 240 that may include the MME/SGW functionality shown in FIG. 1, and which provides connectivity with a network, such as a telephone network and/or a data communications network (such as, the internet 238) for example.

The UE 210 includes a controller, such as a computer or a data processor (DP) 214 for example, a computer-readable memory medium embodied as a memory (MEM) 216 that stores a program of computer instructions (PROG) 218, and a suitable wireless interface, such as radio frequency (RF) transceiver 212 for example, for bidirectional wireless communications with the eNB 220 via one or more antennas.

The eNB 220 also includes a controller, such as a computer or a data processor (DP) 224 for example, a computer-readable memory medium embodied as a memory (MEM) 226 that stores a program of computer instructions (PROG)

228, and a suitable wireless interface, such as RF transceiver 222 for example, for communication with the UE 210 via one or more antennas. The eNB 220 is coupled via a data/control path 234 to the NCE 240. The path 234 may be implemented as the S1 interface shown in FIG. 1. The eNB 220 may also be coupled to another eNB via data/control path 236, which may be implemented as the X2 interface shown in FIG. 1.

The NCE 240 includes a controller, such as a computer or a data processor (DP) 244 for example, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments, as will be discussed below in greater detail.

That is, various exemplary embodiments may be implemented at least in part by computer software executable by the DP 214 of the UE 210; by the DP 224 of the eNB 220; and/or by the DP 244 of the NCE 240, or by hardware, or by a combination of software and hardware (and firmware).

The UE 210 and the eNB 220 may also include dedicated processors, for example CSI processor 215 and CSI processor 225.

In general, the various embodiments of the UE 210 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions for example.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory for example. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (such as, RF transceivers 212 and 222 for example) may be of any type suitable to the local technical environment and may be implemented using any suitable communication technology such as individual transmitters, receivers, transceivers or a combination of such components for example.

Figure 3:
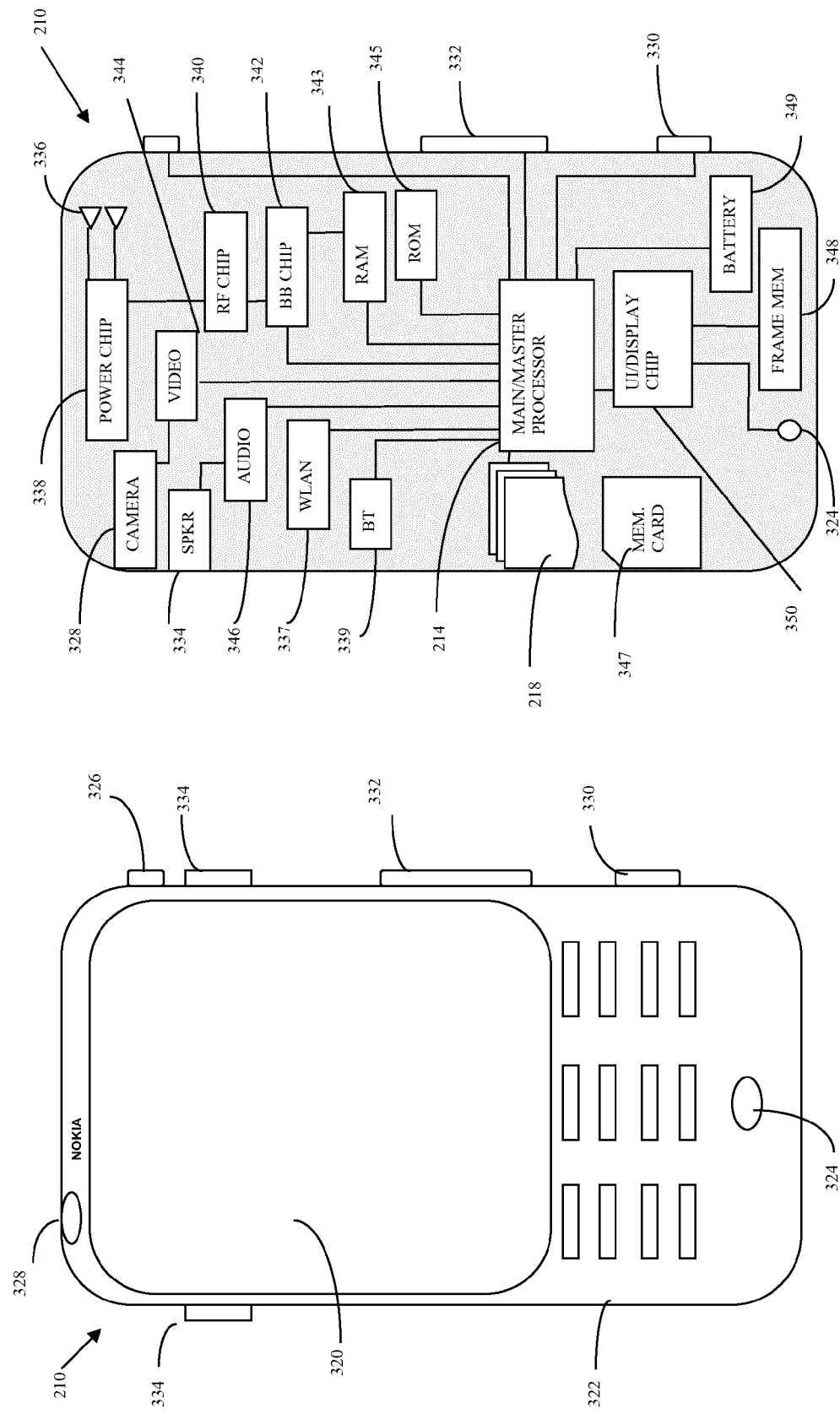
FIG. 3 shows a more particularized block diagram of an exemplary user equipment such as that shown at FIG. 2.

FIG. 3 illustrates further detail of an exemplary UE in both plan view (left) and sectional view (right), and various exemplary embodiments may be embodied in one or some combination of those more function-specific components. At FIG. 3 the UE 210 has a graphical display interface 320 and a user interface 322 illustrated as a keypad but understood as also encompassing touch-screen technology at the graphical display interface 320 and voice-recognition technology received at the microphone 324. A power actuator 326 controls the device being turned on and off by the user. The exemplary UE 210 may have a camera 328 which is shown as being forward facing (such as, for video calls for example) but may alternatively or additionally be rearward facing (such as, for capturing images and video for local storage for example). The camera 328 is controlled by a shutter actuator 330 and optionally by a zoom actuator 332 which may alternatively function as a volume adjustment for the speaker(s) 334 when the camera 328 is not in an active mode.

Within the sectional view of FIG. 3 are seen multiple transmit/receive antennas 336 that are typically used for cellular communication. The antennas 336 may be multiband for use with other radios in the UE. The operable ground plane for the antennas 336 is shown by shading as spanning the entire space enclosed by the UE housing though in some embodiments the ground plane may be limited to a smaller area, such as disposed on a printed wiring board on which the power chip 338 is formed for example. The power chip 338 controls power amplification on the channels being transmitted and/or across the antennas that transmit simultaneously where spatial diversity is used, and amplifies the received signals. The power chip 338 outputs the amplified received signal to the radio-frequency (RF) chip 340 which demodulates and downconverts the signal for baseband processing. The baseband (BB) chip 342 detects the signal which is then converted to a bit-stream and finally decoded. Similar processing occurs in reverse for signals generated in the apparatus 210 and transmitted from it.

Signals to and from the camera 328 pass through an image/video processor 344 which encodes and decodes the various image frames. A separate audio processor 346 may also be present controlling signals to and from the speakers 334 and the microphone 324. The graphical display interface 320 is refreshed from a frame memory 348 as controlled by a user interface chip 350 which may process signals to and from the display interface 320 and/or additionally process user inputs from the keypad 322 and elsewhere.

Certain embodiments of the UE 210 may also include one or more secondary radios such as a wireless local area network radio WLAN 337 and a Bluetooth® radio 339 for example, which may incorporate an antenna on-chip or be coupled to an off-chip antenna. Throughout the apparatus are various memories such as random access memory RAM 343, read only memory ROM 345 for example, and in some embodiments removable memory such as the illustrated memory card 347 for example. The various programs 218 are stored in one or more of these memories. All of these components within the UE 210 are normally powered by a portable power supply such as a battery 349 for example.

Processors 338, 340, 342, 344, 346, 350, if embodied as separate entities in a UE 210 or eNB 220, may operate in a slave relationship to the main processor 214, 224, which may then be in a master relationship to them. Various exemplary embodiments may be relevant to the CSI processor 215 and CSI processor 225, though it is noted that other embodiments need not be disposed there but may be disposed across various chips and memories as shown or disposed within another processor that combines some of the functions described above for FIG. 3. Any or all of these various processors of FIG. 3 access one or more of the various memories, which may be on-chip with the processor or separate therefrom. Similar function-specific components that are directed toward communications over a network broader than a piconet (such as, components 336, 338, 340, 342-345 and 347 for example) may also be disposed in exemplary embodiments of the access node 220, which may have an array of tower-mounted antennas rather than the two shown at FIG. 3.

Note that the various chips (such as, 338, 340, 342, etc. for example) that were described above may be combined into a fewer number than described and, in a most compact case, may all be embodied physically within a single chip.

Various exemplary embodiment define an uplink control signaling format indicator (UCFI) for the PUCCH which indicates how the contents of the rest of the control channel (such as ACK/NACK or CSI for example) are to be identified (such as, payload size, location, etc. for example). The UCFI may be embedded into the reference signal(s) for the PUCCH. The UE may select the reference signal resource(s) to be used (or modulating reference signals) depending on which control signals are present in the message. The eNB, upon receiving the RS resource(s), may verify the current control signal combination based on received UCFI and detect the rest of the control channel(s) according to predetermined rules. Using this technique the UCFI does not impact (such as, reduce for example) the payload usable control signals.

Figure 4:
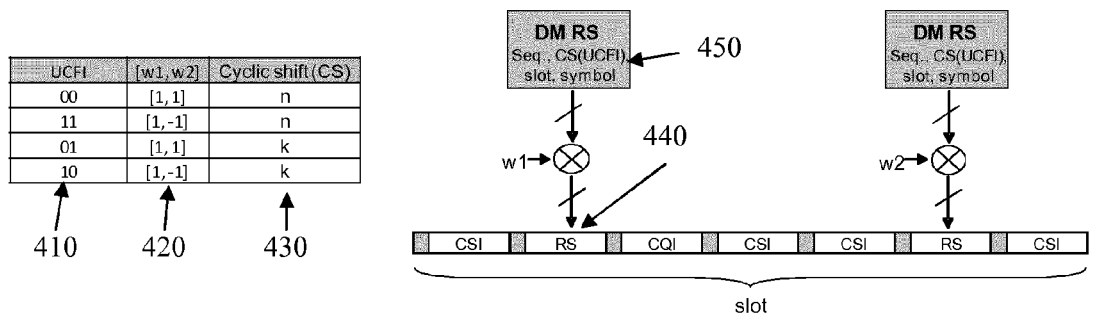
FIG. 4 illustrates a UCFI selecting an orthogonal cover code (OCC) and a cyclic shift (CS) in accordance with various exemplary embodiments.

There are a couple of ways to embed the UCFI into the UL DM RS. FIG. 4 illustrates a UCFI 410 selecting an orthogonal cover code (OCC) 420 and a cyclic shift (CS) 430 in accordance with various exemplary embodiments. The UCFI 410 may be used for selecting the resource 440 (OCC 420 and/or CS 430) on which the PUCCH DM RS 450 are transmitted.

Figures 5, 6, 7:
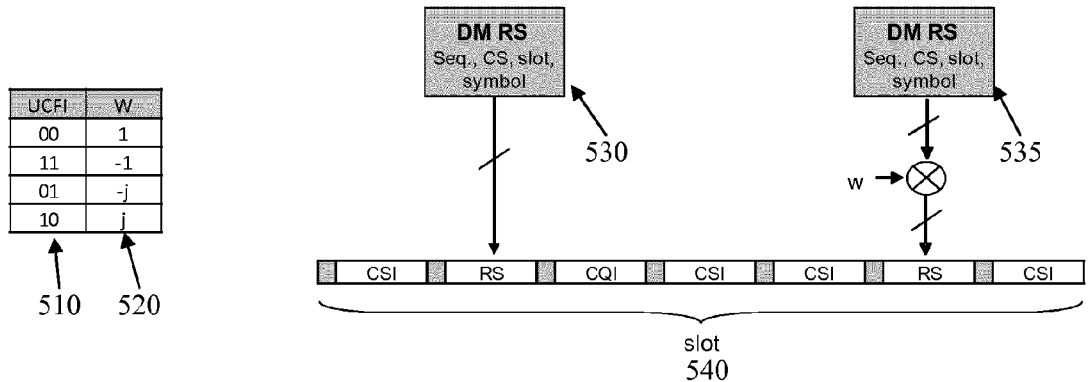
FIG. 5 illustrates a UCFI modulating the second demodulation reference symbol of the slot in accordance with various exemplary embodiments.
FIG. 6 shows an exemplary UCFI interpretation for a multiple CSI case in accordance with various exemplary embodiments.
FIG. 7 shows an example of multiplexing ACK/NACK and CSI with the help of an UCFI in accordance with various exemplary embodiments.

FIG. 5 illustrates a UCFI modulating the second demodulation reference symbol of the slot in accordance with various exemplary embodiments. The UCFI 510 may be used to modulate the second DM RS SC-FDMA symbol 535 within each slot 540 (such as, similar to ACK/NACK signaling with PUCCH format 2a/2b, BPSK/QPSK modulation on top of 2nd RS block for example). The second DM RS SC-FDMA symbol 535 is similar to the first DM RS SC-FDMA symbol 530 but is modulated by the W 520 indicated by the UCFI 510.

One case where the UCFI is particularly useful is where transmitting CSI (including CQI, PMI, RI etc.) with a multi-bit ACK/NACK (>2-bit). In the current specifications (LTE Release 10) such a combination is not supported. Instead certain dropping rules have been defined for how to prioritize the transmission of ACK/NACK. However, it would be beneficial to be able to transmit both ACK/NACK and CSI simultaneously on the PUCCH.

CSI+ACK/NACK Using PUCCH Format 3

The UCFI indicates the presence of ACK/NACK and hence also the payload size of the control message. This allows for simple joint encoding/detection of the ACK/NACK and CSI without the eNodeB performing blind detection of multiple payload sizes. For example, the eNodeB may be configured with three CCs, one with spatial multiplexing enabled. As a result, the size of the ACK/NACK codebook is 4 bits, which is achieved as a combination of 2 bits (MIMO), 1 bit (SIMO) and 1 bit (SIMO). The UE may be configured to transmit periodic CSI for each CC in the same subframe with certain parameters. When transmitting both a 4-bit ACK/NACK as well as the periodic CSIs simultaneously the UE includes the UCFI into the PUCCH transmission to indicate the presence of multi-bit ACK/NACK and jointly encodes the CSIs as well as the 4-bit ACK/NACK. Thus, the eNodeB may then correspondingly first decode the UCFI and based on that the eNodeB knows the payload size of the remainder of the message.

CSI+ACK/NACK Using PUCCH Format 2

Similar to the PUCCH format 3 case, this option is useful when the UE does not support PUCCH format 3 by using the smaller payload of PUCCH 2. The payload of PUCCH format 2 may be limited up to 11 bits. This is sufficient for various cases, for example, in a 2 CC-case when multiple CSIs which do collide. FIG. 6 shows an exemplary UCFI 610 interpretation for a multiple CSI case in accordance with various exemplary embodiments. In this example, UCFI 610 consists of two bits and indicates the number of cells carrying CSI 620.

When only the DL PCell is scheduled, the PUCCH DM RS may then be used to convey ACK/NACK (such as, as in PUCCH format 2a/2b for example). Thus, they may not be utilized for the UCFI. One option would be to allow for PCell-only optimized transmission in combination with UCFI. Another option is to use the PCell-only combination for ACK/NACK and the CSI may be a multiplexing combination behind the UCFI. FIGS. 7 and 8 show examples of multiplexing ACK/NACK and CSI with the help of an UCFI in accordance with various exemplary embodiments. FIGS. 7 and 8 shows a UCFI 710, 810 indicating codebook sizes 720, 820 to be used.

Transmission of Multiple CSIs (+ACK/NACK)

The UCFI may also be used to indicate other properties of uplink control signals. The UCFI may be used when transmitting multiple CSIs (including CQI, PMI, RI etc) related to different component carriers (such as, as in CA for example) and/or cells (such as, as in CoMP for example) during the same subframe (as well as potentially ACK/NACKs) or more generically different CSI reporting configurations. Rel-10 functionality is based on pre-defined priorities/dropping rules and only one CSI may be transmitted at a time (subframe). On the other hand, CSI measurement and transmission is needed only in the case of activated CCs/Cells. MAC-level activation/deactivation is subject to signaling errors.

Here, the UCFI could be used to improve the signaling robustness. The CSI corresponding to deactivated SCells can be dropped. The CSI corresponding to activated SCells could then be jointly coded using either PUCCH Format 2 or Format 3. The UCFI could be used as a verification on the number of CSI multiplexed on Format 2/Format 3 (such as, to handle error cases due to MAC-level activation/deactivation for example). The reference signals can be used to convey the UCFI.

Although in some of the exemplary embodiments discussed the UCFI is described as carrying two bits of information (and four states/code points, respectively), this is not a strict limitation. There could be two states to choose from (such as, with 1 bit for example) or alternatively more than four (such as, with more than 2 bits for example).

Based on the foregoing it should be apparent that various exemplary embodiments provide a method, apparatus and computer program(s) to provide UL control signaling for carrier aggregation, CoMP and/or eICIC.

Figure 9:
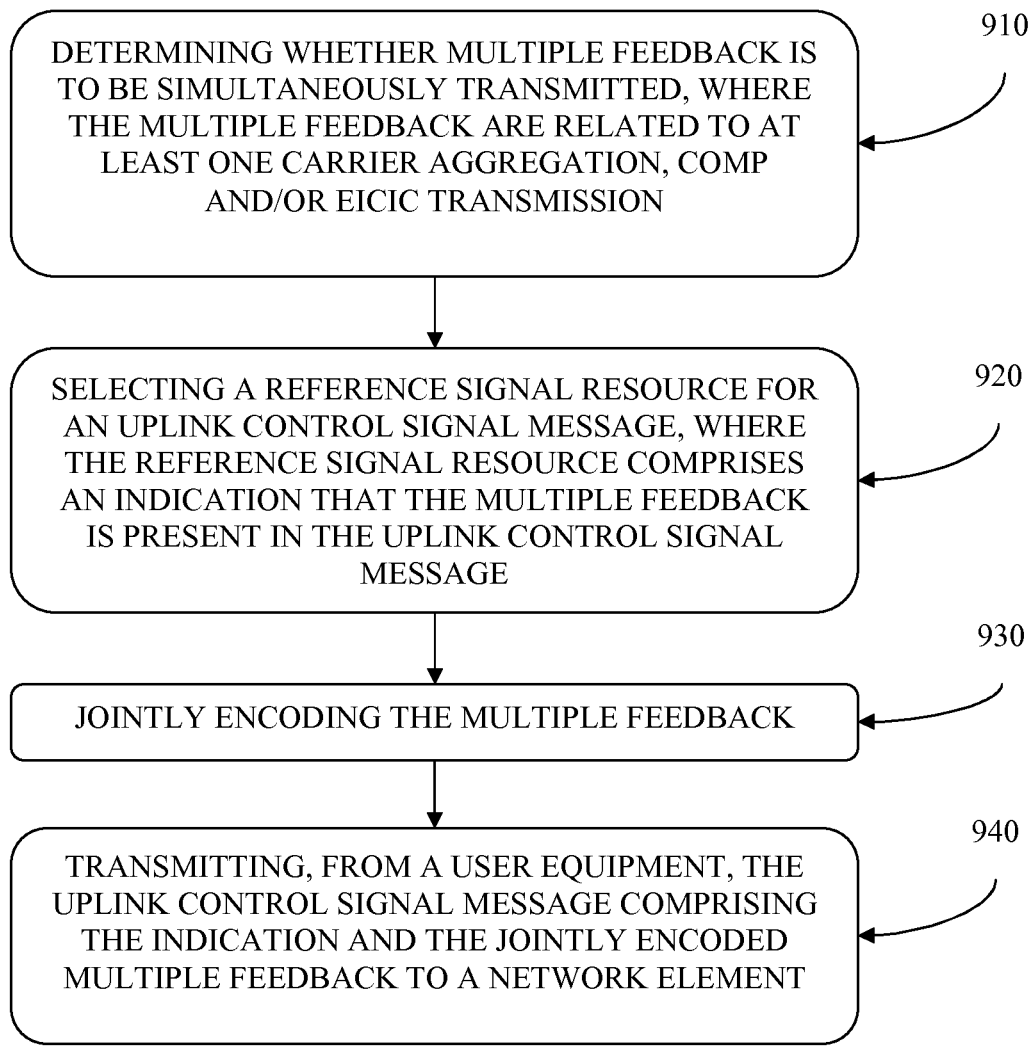
FIG. 9 is a logic flow diagram that illustrates the operation of an exemplary method, and a result of execution of computer program instructions embodied on a computer readable memory, in accordance with various exemplary embodiments.

FIG. 9 is a logic flow diagram that illustrates the operation of a method, and a result of execution of computer program instructions, in accordance with various exemplary embodiments. In accordance with these exemplary embodiments a method performs, at Block 910, a step of determining whether multiple FB (such as, a plurality of FB each for one channel of a multiple of channels, a plurality of FB regarding one channel (CSI, A/N, etc.), etc. for example) is to be simultaneously transmitted. The multiple FB are related to at least one CA, CoMP and/or eICIC transmission. A RS resource for an UL control signal message is selected at Block 920. The RS resource comprises an indication that the multiple FB is present in the UL control signal message. At Block 930 the method jointly encodes the multiple FB. The UL control signal message comprising the indication and the jointly encoded multiple FB is transmitted from a user equipment to a network element at Block 940.

The FB may include FB for different cooperating cells in a CoMP transmission, resource specific CSI measurements/feedback for time domain multiplexed eICIC transmission and/or CSI and ACK/NACK for CC in a CA transmission.

The various blocks shown in FIG. 9 may be viewed as method steps, and/or as operations that result from operation of computer program code, and/or as a plurality of coupled logic circuit elements constructed to carry out the associated function(s).

An exemplary embodiment is a method to provide UL control signaling for CA, CoMP and/or eICIC. The method includes determining whether multiple FB is to be simultaneously transmitted. The multiple FB are related to at least one CA, CoMP and/or eICIC transmission. A RS resource for an UL control signal message is selected. The RS resource comprises an indication that the multiple FB is present in the UL control signal message. The multiple FB is jointly encoded. The method also includes transmitting, from a user equipment, the UL control signal message comprising the indication and the jointly encoded multiple FB to a network element.

In a further exemplary embodiment of the method above, the multiple FB includes at least one of channel state information and ACK/NACK data.

In an additional exemplary embodiment of any one of the methods above, the indication is an UL control signaling format indicator.

In a further exemplary embodiment of any one of the methods above, the indication indicates a resource on which a DM RS is transmitted.

In an additional exemplary embodiment of any one of the methods above, the resource is at least one of: an OCC and a CS.

In a further exemplary embodiment of any one of the methods above, transmitting includes transmitting the UL control signal message on a PUCCH.

An additional exemplary embodiment is a method to provide UL control signaling for CA, CoMP and/or eICIC. The method includes receiving, from a user equipment, an UL control signal message at a network element. The UL control signal message includes a RS resource which includes an indicator. The method also includes determining a payload size of the UL control signal message based at least in part on the indicator.

In a further exemplary embodiment of the method above, the method also includes determining whether multiple FB were simultaneously transmitted based on the indicator. The FB is related to at least one CA, CoMP and/or eICIC transmission.

An additional exemplary embodiment is an apparatus to provide UL control signaling for CA, CoMP and/or eICIC. The apparatus includes at least one processor; and at least one memory storing computer program code. The at least one memory and the computer program code are configured to, with the at least one processor, cause the apparatus to perform actions. The actions include determining whether multiple FB is to be simultaneously transmitted. The multiple FB are related to at least one CA, CoMP and/or eICIC transmission. A RS resource for an UL control signal message is selected. The RS resource comprises an indication that the multiple FB is present in the UL control signal message. The multiple FB is jointly encoded. The actions also include transmitting, from a user equipment, the UL control signal message comprising the indication and the jointly encoded multiple FB to a network element.

In a further exemplary embodiment of the apparatus above, the multiple FB includes at least one of channel state information and ACK/NACK data.

In an additional exemplary embodiment of any one of the apparatus above, the indication is an UL control signaling format indicator.

In a further exemplary embodiment of any one of the apparatus above, the indication indicates a resource on which a DM RS is transmitted.

In an additional exemplary embodiment of any one of the apparatus above, the resource is at least one of: an OCC and a CS.

In a further exemplary embodiment of any one of the apparatus above, transmitting includes transmitting the UL control signal message on a PUCCH.

An additional exemplary embodiment is an apparatus to provide UL control signaling for CA, CoMP and/or eICIC. The apparatus includes at least one processor; and at least one memory storing computer program code. The at least one memory and the computer program code are configured to, with the at least one processor, cause the apparatus to perform actions. The actions include receiving, from a user equipment, an UL control signal message at a network element. The UL control signal message includes a RS resource which includes an indicator. The actions also include determining a payload size of the UL control signal message based at least in part on the indicator.

In a further exemplary embodiment of the apparatus above, the actions also include determining whether multiple FB were simultaneously transmitted based on the indicator. The FB is related to at least one CA, CoMP and/or eICIC transmission.

An additional exemplary embodiment is a computer readable medium to provide UL control signaling for CA, CoMP and/or eICIC. The computer readable medium is tangibly encoded with a computer program executable by a processor to perform actions. The actions include determining whether multiple FB is to be simultaneously transmitted. The multiple FB are related to at least one CA, CoMP and/or eICIC transmission. A RS resource for an UL control signal message is selected. The RS resource comprises an indication that the multiple FB is present in the UL control signal message. The multiple FB is jointly encoded. The actions also include transmitting, from a user equipment, the UL control signal message comprising the indication and the jointly encoded multiple FB to a network element.

In a further exemplary embodiment of the computer readable medium above, the multiple FB includes at least one of channel state information and ACK/NACK data.

In an additional exemplary embodiment of any one of the computer readable media above, the indication is an UL control signaling format indicator.

In a further exemplary embodiment of any one of the computer readable media above, the indication indicates a resource on which a DM RS is transmitted.

In an additional exemplary embodiment of any one of the computer readable media above, the resource is at least one of: an OCC and a CS.

In a further exemplary embodiment of any one of the computer readable media above, transmitting includes transmitting the UL control signal message on a PUCCH.

An additional exemplary embodiment is a computer readable media to provide UL control signaling for CA, CoMP and/or eICIC. The computer readable medium is tangibly encoded with a computer program executable by a processor to perform actions. The actions include receiving, from a user equipment, an UL control signal message at a network element. The UL control signal message includes a RS resource which includes an indicator. The actions also include determining a payload size of the UL control signal message based at least in part on the indicator.

In a further exemplary embodiment of the computer readable medium above, the actions also include determining whether multiple FB were simultaneously transmitted based on the indicator. The FB is related to at least one CA, CoMP and/or eICIC transmission.

An additional exemplary embodiment is an apparatus to provide UL control signaling for CA, CoMP and/or eICIC. The apparatus includes means for determining whether multiple FB is to be simultaneously transmitted; means for selecting a reference signal resource for an UL control signal message; means for jointly encoding the multiple FB; and means for transmitting the UL control signal message which includes the indication and the jointly encoded multiple FB to a network element. The multiple FB is related to at least one CA, CoMP and/or eICIC transmission and the RS resource comprises an indication that the multiple FB is present in the UL control signal message In a further exemplary embodiment of the apparatus above, the multiple FB includes at least one of channel state information and ACK/NACK data.

In an additional exemplary embodiment of any one of the apparatus above, the indication is an UL control signaling format indicator.

In a further exemplary embodiment of any one of the apparatus above, the indication indicates a resource on which a DM RS is transmitted.

In an additional exemplary embodiment of any one of the apparatus above, the resource is at least one of: an OCC and a CS.

In a further exemplary embodiment of any one of the apparatus above, transmitting includes transmitting the UL control signal message on a PUCCH.

An additional exemplary embodiment is an apparatus to provide UL control signaling for CA, CoMP and/or eICIC. The apparatus includes means for receiving, from a user equipment, an UL control signal message at a network element; and means for determining a payload size of the UL control signal message based at least in part on an indicator. The UL control signal message includes a reference signal resource which includes the indicator.

In a further exemplary embodiment of the apparatus above, the apparatus also includes means for determining whether multiple FB were simultaneously transmitted based on the indicator, where the FB is related to at least one CA, CoMP and/or eICIC transmission.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of various exemplary embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of various exemplary embodiments may be practiced in various components such as integrated circuit chips and modules for example, and that various exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with various exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

For example, while various exemplary embodiments have been described above in the context of the E-UTRAN (UTRAN-LTE) system, it should be appreciated that various exemplary embodiments are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (such as, CSI, TFCI, RI, etc. for example) are not intended to be limiting in any respect, as these parameters may be identified by any suitable names. Further, the various names assigned to different channels (such as, PRACH, PUCCH, PUSCH, etc. for example) are not intended to be limiting in any respect, as these various channels may be identified by any suitable names.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

The following abbreviations that may be found in the specification and/or the drawing figures are defined as follows:
3GPP third generation partnership project
A/N ACK/NACK
ACK acknowledge
BPSK/QPSK binary phase shift keying/quadrature phase shift keying
BS basestation
BW bandwidth
CA carrier aggregation
CC component carrier
CDM code division multiplexing
CoMP coordinated multi-point
CQI channel quality indicator
CS cyclic shift
CSI channel state information (including CQI, PMI, RI and/or PTI)
DAI downlink assignment index
DL downlink (eNB towards UE)
DM demodulation
DPDCH dedicated physical data channel
eNB E-UTRAN Node B (evolved Node B/LTE basestation)
EPC evolved packet core
E-UTRAN evolved UTRAN (LTE)
eICIC enhanced inter-cell interference coordination
FB feedback
FDD frequency division duplex
HARQ hybrid automatic repeat request
LTE long term evolution of UTRAN (E-UTRAN)
MAC medium access control (layer 2, L2)
MIMO multi-input, multi-output
ML maximum-likelihood
MM/MME mobility management/mobility management entity
MU multi-user
NACK not acknowledge/negative acknowledge
NB Node B
Node B base station
O&M operations and maintenance
OCC orthogonal cover code
OFDMA orthogonal frequency division multiple access
PCell primary cell
PDCP packet data convergence protocol
PHY physical (layer 1, L1)
PMI precoder matrix indicator
PRACH physical random access channel
PRB physical resource block
PTI precoder type indicator
PUCCH physical uplink control channel
PUSCH physical uplink shared channel
RI rank indicator
RLC radio link control
RRC radio resource control
RRM radio resource management
RS reference signal
SCell secondary cell
SC-FDMA single carrier, frequency division multiple access
S-GW serving gateway
SRI scheduling request indicator
SU single user
TDD time division duplex
TDM time division multiplexing
TFCI transport format combination indicator
UCFI uplink control signaling format indicator
UCI uplink control information
UE user equipment, such as a mobile station or mobile terminal
UL uplink (UE towards eNB)
UTRAN universal terrestrial radio access network
X2 standardized signaling interface between eNBs

What is claimed is:

1. A method comprising:
determining, by a user equipment, to transmit a plurality of uplink control signals including channel state information and at least one of acknowledge and negative-acknowledge data in an uplink control message;
selecting a resource for the uplink control message;
defining, by the user equipment, an uplink control signaling format indicator indicating which uplink control signals are present in the uplink control message;
jointly encoding, by the user equipment, the plurality of uplink control signals into the uplink control message; and
transmitting, from the user equipment, the uplink control message comprising the uplink control signaling format indicator and the jointly encoded plurality of uplink control signals to a network element.

2. The method of claim 1, where the plurality of uplink control signals including the channel state information and the at least one of acknowledge and negative-acknowledge data are for two or more communication cells.

3. The method of claim 2, where the uplink control signaling format indicator comprises two bits to indicate a number of the two or more communication cells for the channel state information.

4. The method of claim 1, where the uplink control signaling format indicator indicates that one of the plurality of uplink control signals is associated with a single cell and another uplink control signal is associated with multiple cells.

5. The method of claim 4, where the uplink control signaling format indicator comprises at least one of: an orthogonal cover code and a cyclic shift.

6. The method of claim 1, where the uplink control signaling format indicator indicates a payload size of the uplink control message to enable joint encoding and detection of the channel state information and the at least one of acknowledge and negative-acknowledge data in the uplink control message at the network element without having to perform blind detection of the payload size.

7. A method comprising:
receiving, from a user equipment, an uplink control message at a network element, where the uplink control message is received on a user equipment selected resource and comprises an uplink control signaling format indicator and a plurality of uplink control signals which comprise channel state information and at least one of acknowledge and negative-acknowledge data, where the uplink control signaling format indicator is identifying which uplink control signals are present in the uplink control message; and
based at least in part on the uplink control signaling format indicator, determining:
a payload size of the uplink control message; and
which uplink control signals are present in the uplink control message.

8. An apparatus, comprising:
at least one processor; and at least one memory including computer program code, the at least one memory and the computer program code configured to, with the at least one processor, cause the apparatus to:

determine to transmit a plurality of uplink control signals including channel state information and at least one of acknowledge and negative-acknowledge data in an uplink control message;

select a resource for the uplink control message;

define an uplink control signaling format indicator indicating which uplink control signals are present in the uplink control message;

jointly encode the plurality of uplink control signals into the uplink control message; and transmit, from a user equipment, the uplink control message comprising the uplink control signaling format indicator and the jointly encoded plurality of uplink control signals to a network element.

9. The apparatus of claim 8, where the plurality of uplink control signals including the channel state information and the at least one of acknowledge and negative-acknowledge data are for two or more communication cells.

10. The apparatus of claim 9, where the uplink control signaling format indicator comprises two bits to indicate a number of the two or more communication cells for the channel state information.

11. The apparatus of claim 8, where the uplink control signaling format indicator indicates that one of the plurality of uplink control signals is associated with a single cell and another uplink control signal is associated with multiple cells.

12. The apparatus of claim 11, where the uplink control signaling format indicator comprises at least one of: an orthogonal cover code and a cyclic shift.

13. The apparatus of claim 8, where the uplink control signaling format indicator indicates a payload size of the uplink control message to enable joint encoding and detection of the channel state information and the at least one of acknowledge and negative-acknowledge data in the uplink control message at the network element without having to perform blind detection of the payload size.

14. An apparatus comprising:
at least one processor:
at least one memory storing computer program code;
wherein the at least one memory and the computer program code are configured to cause an apparatus to at least:
receive, from a user equipment, an uplink control message at a network element, wherein the uplink control message is received on a user equipment selected resource and comprises an uplink control signaling format indicator and a plurality of uplink control signals which comprise channel state information and at least one of acknowledge and negative-acknowledge data, where the uplink control signaling format indicator is identifying which uplink control signals are present in the uplink control message; and
based at least in part on the uplink control signaling format indicator, determine:
a payload size of the uplink control message; and
which uplink control signals are present in the uplink control message.

15. A non-transitory computer readable medium storing a program of instructions, execution of which by at least one processor configures an apparatus to perform actions comprising at least:
determining to transmit a plurality of uplink control signals including channel state information and at least one of acknowledge and negative-acknowledge data in an uplink control message;
selecting a resource for an uplink control message;
defining an uplink control signaling format indicator indicating which uplink control signals are present in the uplink control message;
jointly encoding the plurality of uplink control signals into the uplink control message; and
transmitting, from a user equipment, the uplink control message comprising the uplink control signal format indicator and the jointly encoded plurality of uplink control signals to a network element.

16. The computer readable medium of claim 15, where the channel state information and the at least one of acknowledge and negative-acknowledge data are for two or more communication cells.

17. The computer readable medium of claim 15, where the uplink control signal format indicator comprises two bits to indicate a number of the two or more communication cells for the channel state information.

18. The computer readable medium of claim 15, where the uplink control signaling format indicator indicates that one of the plurality of uplink control signals is associated with a single cell and another uplink control signal is associated with multiple cells.

19. The computer readable medium of claim 18, where the uplink control signaling format indicator comprises at least one of: an orthogonal cover code and a cyclic shift.

20. The computer readable medium of claim 15, where transmitting comprises transmitting the uplink control message on a physical uplink control channel.

21. A non-transitory computer readable medium tangibly encoded with a computer program executable by a processor to perform actions comprising:
receiving, from a user equipment, an uplink control message at a network element, wherein the uplink control message comprises an uplink control signaling format indicator and a plurality of uplink control signals which comprise channel state information and at least one of acknowledge and negative-acknowledge data, where the uplink control signaling format indicator is identifying which uplink control signals are present in the uplink control message, where the uplink control message is received on a user equipment selected resource; and
based at least in part on the uplink control signaling format indicator, determining:
a payload size of the uplink control message; and
which uplink control signals are present in the uplink control message.

* * * * *